United States Patent [19]
Meyer

[11] Patent Number: 5,933,449
[45] Date of Patent: *Aug. 3, 1999

[54] SWITCHER FOR FLEXIBLY INTERCONNECTING COMMUNICATION PORTS

[75] Inventor: Charles S. Meyer, Nevada City, Calif.

[73] Assignee: Nvision, Inc., Grass Valley, Calif.

[ * ] Notice: This patent is subject to a terminal disclaimer.

[21] Appl. No.: 08/953,053

[22] Filed: Oct. 17, 1997

Related U.S. Application Data

[60] Division of application No. 08/399,819, Mar. 6, 1995, Pat. No. 5,751,764, and a continuation-in-part of application No. 08/048,733, Apr. 16, 1993, Pat. No. 5,396,512.

[51] Int. Cl.$^6$ .............................. H04B 1/40; H04L 25/02; H04L 12/02
[52] U.S. Cl. ...................... 375/219; 340/825.03; 370/380
[58] Field of Search ..................................... 375/219, 257, 375/220, 211, 377, 259; 340/825.03, 825.04, 825.02, 825.79, 825.8, 825, 826, 827; 370/356, 359, 380, 384, 466; 333/1, 100, 101, 105, 107, 103, 104, 109, 112, 115, 116, 117, 118, 81 A, 262; 326/56, 57, 58, 86, 87, 88, 26, 30; 348/705, 706; 327/427; 395/311, 312

[56] References Cited

U.S. PATENT DOCUMENTS

| 4,736,394 | 4/1988 | Giovannelli et al. .................... 375/121 |
| 5,088,112 | 2/1992 | Pyhalammi et al. ........................ 375/36 |
| 5,118,974 | 6/1992 | Yarbrough et al. ....................... 307/473 |
| 5,345,288 | 9/1994 | Franaszek et al. .................. 340/825.79 |
| 5,530,434 | 6/1996 | Kanda ................................ 340/825.04 |

*Primary Examiner*—Chi H. Pham
*Assistant Examiner*—William Luther
*Attorney, Agent, or Firm*—Smith-Hill and Bedell

[57] ABSTRACT

A transceiver includes a first receiver having an input connected to a first I/O port of the transceiver and an output connected to an output port of the transceiver and a second receiver having an input connected to a second I/O port of the transceiver and an output connected to the output port of the transceiver. A first driver has an input connected to an input port of the transceiver and an output connected to the first I/O port, and a second driver has an input connected to the input port of the transceiver and an output connected to the second I/O port. The transceiver has a first state in which the first receiver and second driver are enabled and propagate signals from the first I/O port to the output port and from the input port to the second I/O port and the second receiver is disabled and presents a high impedance to the output port, and a second state in which the second receiver and first driver are enabled and propagate signals from the second I/O port to the output port and from the input port to the first I/O port and the first receiver is disabled and presents a high impedance to the output port.

4 Claims, 3 Drawing Sheets

SWITCHER FOR FLEXIBLY INTERCONNECTING COMMUNICATION PORTS

CROSS-REFERENCE TO RELATED APPLICATION

This application is filed as a divisional of patent application Ser. No. 08/399,819 filed Mar. 6, 1995, now U.S. Pat. No. 5,751,764, which was filed as a continuation-in-part of patent application Ser. No. 08/048,733 filed Apr. 16, 1993, now U.S. Pat. No. 5,396,512, the disclosure of which is hereby incorporated by reference herein.

BACKGROUND OF THE INVENTION

This invention relates to a switcher for flexibly interconnecting communication ports.

A television post production facility comprises an ensemble of machines of various types, such as editors, digital video effects devices, and video tape recorders (VTRs). During an editing session, the producer employs an editor to control the operations (playback, record, etc.) performed by the other machines to produce a final master tape.

In a given post production facility, several editing sessions, each requiring use of an editor and two or more other machines, may be conducted at any given time, and during a given editing session the producer might wish to add and drop machines from and to the suite of machines that are being used in the session.

In order to allow an ensemble of machines to be interconnected in a flexible fashion in different suites, without needing to swap cables whenever a change is desired, the machines may be connected to a digital routing switcher. The communication port of each machine includes at least one driver and at least one receiver, and the switcher forms a forward bus and reverse bus to which the drivers and receivers are connected.

In general, one of the machines is designated a source machine and transmits command messages to the other machines over the forward bus. The other machines, designated destination machines, receive the message from the source machine and generate response messages. In order to prevent a collision of response messages, a single destination machine is designated as the responding machine and the response messages of the other destination machines are blocked. When a suite is changed by adding or dropping a machine, it is difficult and inconvenient to keep track of the most recent configuration of the added or dropped machine and make sure that the machines of the new suite are properly configured.

In the case of a post production facility, the editor is generally the source machine and the destination machines are VTRs. The editor typically can support several forward buses and several reverse buses, so that the suite of machines controlled by a single editor may be composed of several subsuites of machines.

As described in the co-pending application, a port that is connected to the reverse bus may degrade the characteristics of the bus. This problem arises particularly when the suite of machines being used in an edit session is changed, since unless a machine that is dropped is switched off, it remains on the bus and it may generate response messages.

SUMMARY OF THE INVENTION

According to a first aspect of the present invention there is provided a transceiver having first and second I/O ports for connection to a signal transmitting and receiving machine, an input port and an output port, and comprising a first receiver having an input connected to said first I/O port and an output connected to said output port of the transceiver, a second receiver having an input connected to the second I/O port and an output connected to the output port of the transceiver, a first driver having an input connected to the input port of the transceiver and an output connected to the first I/O port, and a second driver having an input connected to the input port of the transceiver and an output connected to the second I/O port, the transceiver having a first state in which the first receiver and second driver are enabled and propagate signals from the first I/O port of the transceiver to the output port thereof and from the input port of the transceiver to the second I/O port and the second receiver is disabled and presents a high impedance to the output port of the transceiver, and a second state in which the second receiver and first driver are enabled and propagate signals from the second I/O port of the transceiver to the output port thereof and from the input port of the transceiver to the first I/O port and the first receiver is disabled and presents a high impedance to the output port of the transceiver.

According to a second aspect of the present invention there is provided signal transmitting and receiving apparatus comprising a signal transmitting and receiving machine having an I/O port including first and second connection pins of which one is a transmitting pin and the other is a receiving pin, and the machine also comprising a driver for providing an output signal at the transmitting pin of its I/O port and a receiver for receiving an input signal at the receiving pin thereof, and a port transceiver having first and second I/O pins, an input pin and an output pin, the port transceiver having its first I/O pin connected to the first connection pin of the I/O port of the signal transmitting and receiving machine and its second I/O pin connected to the second connection pin of the I/O port of the signal transmitting and receiving machine, and the port transceiver comprising means providing a first output signal path from the first I/O pin of the transceiver to the output pin thereof, means providing a second output signal path from the second I/O pin of the transceiver to the output pin thereof, means providing a first input signal path from the input pin of the transceiver to the first I/O pin thereof, and means providing a second input signal path from the input pin of the transceiver to the second I/O pin thereof, and the port transceiver having a first state in which it propagates a signal received at its input pin to its second I/O pin and a signal received at its first I/O pin to its output pin and the second output signal path presents a high impedance to the output pin of the transceiver, and a second state in which it propagates a signal received at its input pin to its first I/O pin and a signal received at its second I/O pin to its output pin and the first signal path presents a high impedance to the output pin of the transceiver.

According to a third aspect of the present invention there is provided apparatus comprising n signal transmitting and receiving machines each having an I/O port including a transmitting pin and a receiving pin, and each machine comprising a driver for providing an output signal at the transmitting pin of its I/O port and a receiver for receiving an input signal at the receiving pin thereof, n port transceivers each having a machine side input terminal, a machine side output terminal, a switcher side input terminal and a switcher side output terminal, the ith port transceiver having its machine side input terminal connected to the transmitting pin of the ith machine and its machine side output terminal connected to the receiving pin of the ith machine, and each port transceiver comprising receiver means providing an output signal path from the machine side input terminal of the transceiver to the switcher side output terminal thereof, driver means providing an input signal path from the switcher side input terminal of the transceiver to the machine side output terminal thereof, and the receiver means having a first state in which it propagates a signal received at the machine side input terminal of the transceiver to the switcher side output terminal thereof and a second state in which it blocks a signal received at the switcher side input terminal and presents a high impedance to the machine side output terminal, and the driver means having a first state in which it propagates a signal received at switcher side input terminal of the transceiver to its machine side output terminal thereof and a second state in which it blocks a signal received at the switcher side input terminal, control means for selectively placing each of the receiver means and the driver means in its first state or its second state, and a switcher having n input terminals and n output terminals, the ith input terminal of the switcher being connected to the switcher side output terminal of the ith port transceiver and the ith output terminal of the switcher being connected to the switcher side input terminal of the ith port transceiver, and the switcher comprising means for connecting the ith input terminal of the switcher to any set of output terminals of the switcher selected from the group that comprises at least the output terminals other than the ith output terminal.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
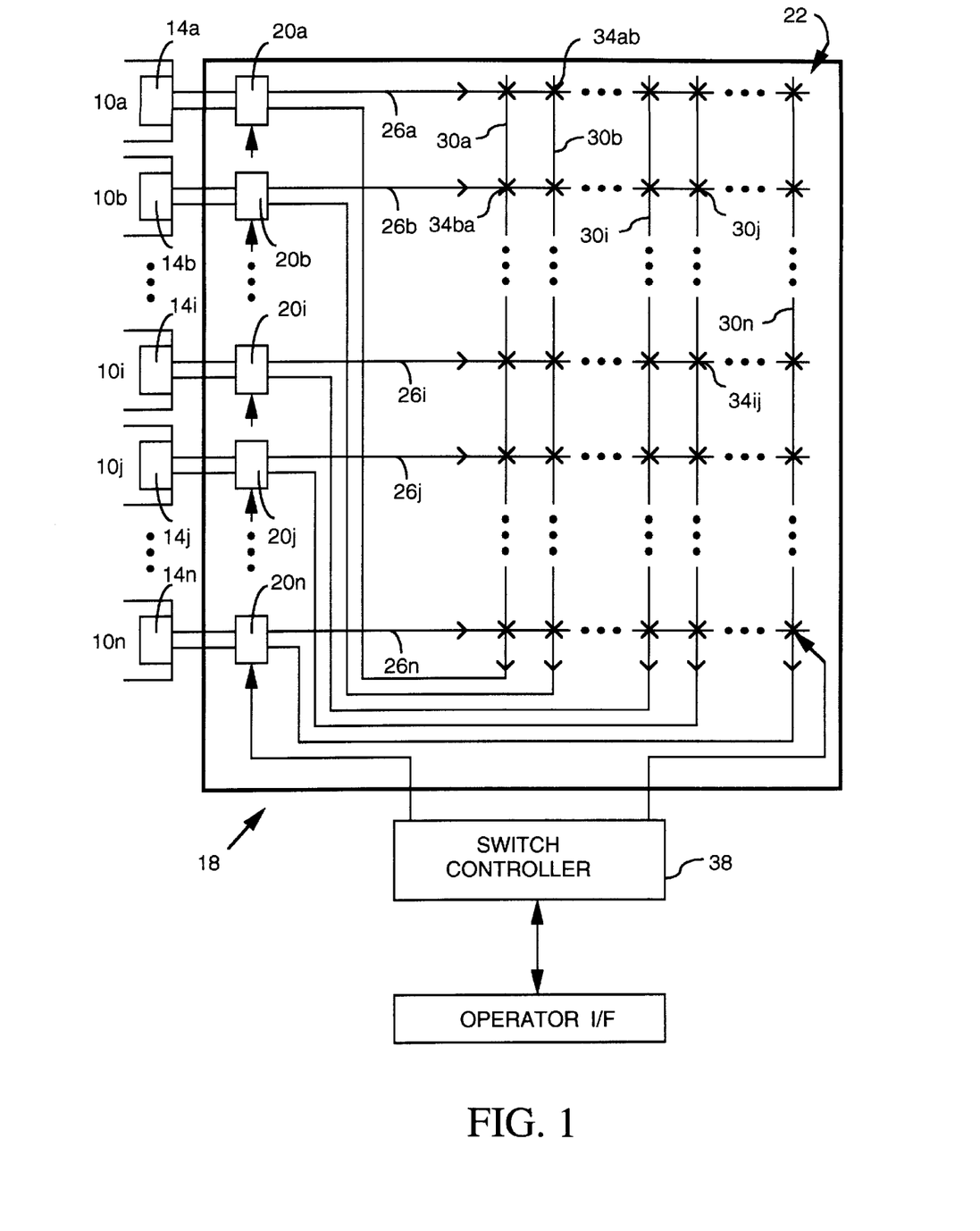
FIG. 1 is a schematic illustration of apparatus that forms part of a professional video post production facility.

The apparatus shown in FIG. 1 comprises multiple machines 10a, 10b, . . . 10n, having respective data communication ports 14a, 14b, . . . 14n, and a routing switcher 18.

The switcher 18 comprises multiple switcher ports 20a, 20b, . . . 20n and a rectangular switching matrix core 22 including input lines 26a, 26b, . . . 26n, output lines 30a, 30b, . . . 30n, and an array of crosspoints 34ij (i=a . . . n, j=a . . . n) whereby the input line 26i can be connected to the output line 30j. Multiple crosspoints on the input line can be enabled, so that the input line can be connected to any selected set of output lines.

If the switcher 18 is to provide a connection between machine 10k as a master machine and machine 10l as a slave machine, a forward connection for commands is provided by connecting input line 26k to output line 30l using the crosspoint 34kl and a reverse connection path is provided by way of input line 26l and output line 30k, connected by crosspoint element 34lk. Since it is not necessary to connect a port's input terminal to its output terminal, the diagonal crosspoints 34ii may be omitted.

The switcher port 20i has two external connection pins, which are connected to respective pins of the machine port 14i. The switcher port 20i has an output node connected to the input line 26i and an input node connected to the output line 30i.

Each crosspoint includes a local memory element (not separately shown). If the local memory element stores a data value 1, the crosspoint is enabled and if the local memory element stores a data value 0, the crosspoint is disabled.

Figure 2:
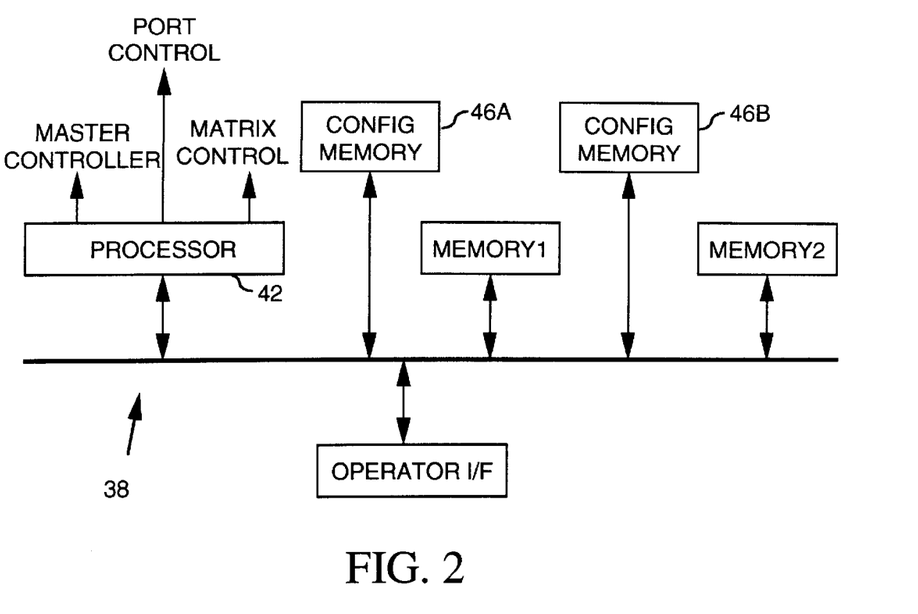
FIG. 2 is a block diagram of an operator interface of the FIG. 1 apparatus.

Referring also to FIG. 2, the switcher 18 further comprises a switch controller 38, which includes a processor 42 and dual switch configuration memories 46A and 46B and receives commands from and provides messages to an operator interface 50. The switch controller 38 also receives a master reference signal, which is also supplied to each of the machines 10. The master reference signal contains at least the frame sync information of the relevant signal standard, such as NTSC for video or AES for audio, and ensures that each machine operates in accordance with a common timing standard. At any given time during operation of the switcher, one of the switch configuration memories, e.g. the memory 46A, is active, and the other memory 46B is in standby state. The active switch configuration memory stores an image of the current configuration of the switching matrix core, i.e. for each crosspoint 34, the memory has a location in which the current state of the crosspoint is stored. During the sync interval of the master reference signal, the local memory element of each crosspoint is refreshed using the contents of the active configuration memory.

In order to change the configuration of the matrix core, the standby configuration memory 46B is loaded with an image of the desired new configuration of the switching matrix core. During the active interval of the master reference signal, the processor is switched over to address the standby memory, so that the memory 46B becomes the active memory, and the memory 46A becomes the standby memory. Consequently during the next sync interval of the master reference, when the local memory elements of the crosspoints are refreshed using the content of the active configuration memory, the configuration of the switch is changed to the desired configuration.

Each switcher port includes at least one driver and at least one receiver, and a two bit port status memory containing a two bit data word (D0,D1) is associated with each switcher port. The value of the data word determines the state of the port. In a preferred embodiment of the invention, which will be described with reference to FIG. 4, the port may be off (0,0), or transmitting on one external pin and receiving on the other external pin (0,1) or vice versa (1,0). The port status memory may be integrated into the controller but it is preferably provided locally as part of the port.

In a practical implementation of the invention, the switcher has 128 input lines and 128 output lines and is able to provide bidirectional communication between 128 switcher ports.

The operator interface 50 of the switcher may comprise several operator panels 50A, 50B, etc., each of which includes knobs and push buttons for control of machines. Each operator panel allows an operator to input commands to change the configuration of the group or suite of machines under control of that operator, by adding machines to the group, dropping machines, or altering the way in which the machines are connected. At the start of a work session, the operator selects an initial suite of available machines. Machines that are dropped become available for use in other work sessions by other operators. A master controller (not shown) keeps track of the machines that have been assigned for use in each active suite, and, conversely, the machines that are available for use, and prevents an operator from selecting a machine that is already part of the suite being used by another operator. The structure and manner of operation of the master controller are not part of the subject matter of this invention.

The apparatus shown in FIGS. 1 and 2 supports two different connection levels, which are referred to herein as level I and level II. A level I connection is a point-to-point connection between a single source and a single destination. Command messages are transmitted from the source to the destination by a forward connection path and response messages are sent from the destination to the source by a reverse connection path. A level II connection has a single source and multiple destinations. Command messages are sent from the source to all the destinations by a forward connection path. One of the destinations is designated as the responding destination and a response message from that destination is sent to the source by way of the reverse connection path. Response messages generated by the other destinations are ignored since the matrix does not map the port outputs to the port providing the response to the machine that issued the command.

The switch controller comprises two memories, designated Memory 1 and Memory 2. Each memory has 128 addressable locations (one for each switcher port), and in the following description the letter i is used to refer to the address of the location that is associated with the port 20$i$. Also, positive integer decimal notation, rather than hexadecimal notation, is used for the contents of the memories, in order to emphasize the relationship between the memory contents and the state of the switcher ports. The notation Memory x [i] means the content of Memory X at the location having the address i.

Permitted values of Memory 1 [i] are from 1 to 128, 129 and 256, and permitted values of Memory 2 [i] are from 1 to 128, 129, 255, and 256. If Memory 1 [i] is 129, it means that the port 20$i$ is in use as a source and that the port 20$j$ is the responding destination, where j is the value of Memory 2 [i] (j=1 ... 128, excluding i). If Memory 1 [i] is j, the port 20$i$ is a destination and the port 20$j$ is its source; and Memory 2 [i] indicates whether the destination is a responding destination (129) or is not (255) and is therefore tri-stated in the reverse direction. If Memory 1 [i] is 256, the switcher port 20$i$ is not in use (even though the machine 10$i$ is included in the operator's working suite) and is tri-stated in both directions, and Memory 2 [i] should also be 256. In the case mentioned above with reference to FIG. 4, where the port may be off, transmitting on one pin and receiving on the other pin, or vice versa, the data word (D0,D1) for the switcher port 20$i$ is set at (0,0) if Memory 1 [i] is 256 and Memory 2 [i] is 256; and is otherwise set at (1,0) or (0,1), depending on which pin is transmitting and which is receiving. The value (1,1) is not permitted. Whether a switcher port that is a destination is responding or non-responding is established by the state of the matrix: if the switcher port 20$j$ is a source and the switcher port 20$i$ is a responding destination, the crosspoint 34$ji$ is enabled, whereas if the switcher port 20$j$ is a source and the switcher port 20$i$ is a non-responding destination, the crosspoint 34$ji$ is disabled.

It will be appreciated that the invention is not restricted to the values of Memory 1 [i] and Memory 2 [i] that are indicated above. For example, in a switcher with 256 ports, the values would typically be 1–256, 257, 511, and 512. Even in a 128 port switcher, the choice of permitted values of Memory 1 [i] and Memory 2 [i] is arbitrary: it is only necessary to have one value for each port and two additional values for Memory 1 [i] and one value for each port and three additional values for Memory 2 [i].

The processor 42, or the processor 42 as the main interface processor and a second port control processor (not shown), executes three algorithms to bring the contents of the memories to the proper values in response to a command from the operator interface to establish a new connection.

The processor 42 uses Algorithms 1 and 2 to establish a level I connection between two switcher ports as a new source and a new destination respectively and Algorithms 2 and 3 to establish a level II chain connection between a first switcher port as a new source, a second switcher port as a responding destination, and at least one switcher port as a non-responding destination. Algorithms 1 and 3 operate on the contents of the active memory while Algorithm 2 operates on the contents of the standby memory and runs continuously in conjunction with both Algorithm 1 and Algorithm 3 to make disconnections. Algorithms 1 and 3 each employ the following variables, namely Current Conn to New Dest, Current Conn to New Source, Found Dest, New Source, and New Dest, and Algorithm 3 employs the following flags, namely TakeFlag, TakeDone, and Added to Chain.

In the pseudocode descriptions of the algorithms, [variable]⇔[value] means value is assigned to variable, ==means is equal to, and [variable]=[value] also means value is assigned to variable.

Algorithm 1

---

```
Current Conn to New Dest ← Memory 1 [New Dest]
Current Conn to New Source ← Memory 1 [New Source]
if   (Current Conn to New Dest ≠ 256)
{
    if (Current Conn To New Dest == 129)
    {
        Current Conn to New Dest ← Memory 2 [New Dest]
    }
    Memory 1 [Current Conn to New Dest] ← 256
    Memory 2 [Current Conn to New Dest] ← 256
    Loop thru Memory 1 (Found Dest = 1 . . . 128)
    {
        If (    (Memory 1 [Found Dest] == New Dest) | |
                (Memory 1 [Found Dest] == Current Conn to New
                Dest)
        {
            Memory 1 [Found Dest] ← 256
            Memory 2 [Found Dest] ← 256
        }
    }
}
if ( (Current Conn to New Source ≠ 256)
{
    if (Current Conn to New Source == 129)
    {
        Current Conn to New Source ← Memory 2 [New Source]
    }
    Memory 1 [Current Conn to New Source] = 256
    Memory 2 [Current Conn to New Source] = 256
    Loop thru Memory 1 (Found Dest = . . . 128)
    {
        if ( (Memory 1 [Found Dest] == Curr Conn to New
Source) | |
                (Memory 1 [Found Dest] == New Source) )
        {
            Memory 1 [Found Dest] ← 256
            Memory 2 [Found Dest] ← 256
        }
    }
```

-continued

```
}
Memory 1 [New Source] ← 129
Memory 1 [New Dest] ← New Source
Memory 2 [New Source] ← New Dest
Memory 2 [New Dest} ← 129
```

Algorithm 2

```
Loop: Memory 1, Address = i . . . 128
    if (Memory 1 [Address] == 256)
    {
        Tri-state both directions
    }
    if (Memory i [Address] == i . . . 128)
    {
        Source = Memory 1 [Address]
        Connect FORWARD Source to Address (Destination)
    }
    if (Memory 1 [Address] == 129)
    {
        Response Address = Memory 2 [Address]
    }
Loop: Memory 2, Address = 1 . . . 128
    if (Memory 2 [Address] == 1 . . . 128)
    {
        Memory 2 [Address} ← Memory 2 (Response)
    }
    if (Memory 2 [Address] == 129)
    {
        continue
    }
    if (Memory 2 [Address] == 255)
    {
        Forward take to this port but no response from
        this port (multi-point take)
    }
    if (Memory 2 [Address] == 256)
    {
        TRI-STATE Response from Memory 2 [Address]
    }
```

In an application of Algorithms 1 and 2 to connect the switcher port 20k as a new source and port 20l as a new destination, it is necessary that Memory 1 [k] and Memory 2 [k] be set to 129 and 1 respectively, and that Memory 1 [l] and Memory 2 [l] be set to k and 129 respectively.

Algorithm 1 assigns the value k to the variable New Source and assigns the value 1 to the variable New Dest and the processor reads Memory 1 [k] and Memory 1 [l].

If Memory 1 [l] is 256, the new destination is already tri-stated and the port 20l is available for use and may be added to the suite without further action. If Memory 1 [l] is not 256, the algorithm proceeds to the next step.

If Memory 1 [l] is 129, the switcher port 20l is currently in use as a source and Memory 2 [l] indicates the responding destination, say m. Memory 1 [m] and Memory 2 [m] are each set to 256. The value Memory 1 [i] is read for i from 1 to 128, and if Memory 1 [i] is equal to 1 or m, Memory 1 [i] and Memory 2 [i] are each set to 256.

If Memory 1 [k] is 256, the port 20k is available for use and may be added to the suite without further action. If Memory 1 [k] is not 256, the setting of the new source continues.

If Memory 1 [k] is 129, the switcher port 20k is currently in use as a source and Memory 2 [k] indicates the responding destination, say q. Memory 1 [q] and Memory 2 [q] are each set to 256. The value Memory 1 [i] is read for i from 1 to 128, and if Memory 1 [i] is equal to k or q, Memory 1 [i] and Memory 2 [i] are each set to 256.

In this manner, every destination tied to the port 20l is tri-stated, and the port 20l itself is tri-stated. Similarly, every port tied to the port 20k is tri-stated, and the port 20k itself is tri-stated.

On the basis of the commands received from the operator interface regarding the desired new connection, the processor then sets Memory 1 [k] to 129, Memory 1 [l] to k, Memory 2 [k] to 1, and Memory 2 [l] to 129. In this manner, the contents of Memories 1 and 2 then reflect the fact that the port 20k will be used as a source and there is to be a forward connection to the port 20l, and that the port 20l will be used as a responding destination and there will be a reverse connection to the port 20k.

In Algorithm 2, the processor 42 tests the value of Memory 1 [i] and the value of Memory 2 [i](i=1 . . . 128). In an application to apparatus in which the state of a switcher port may be as described with reference to FIG. 4 (off, transmitting on one pin and receiving on the other pin, or vice versa), and Memory 1 [i] is 256, the processor loads the value (0,0) (tri-state in both directions) into the port status memory for the switcher port 20i. Otherwise, the processor loads the value (0,1) or (1,0) into the port status memory, depending on the connection of the switcher port 20i to the machine port 14i; and if Memory 1 [i] is 129 and Memory 2 [i] is j (j=1 . . . 128, excluding i) the processor enables the crosspoint 34ij whereas if Memory 1 [i] is j the processor either disables or enables the crosspoint 34ji depending on whether the value of Memory 2 [i] is 129 or 255. By looping through the contents of Memory 1 and Memory 2, the contents of the port status memory associated with the switcher ports 20i and 20j and the contents of the local memory elements associated with the crosspoints 34ij and 34ji are brought to the new values determined by the contents of Memory 1 [i] and Memory 2 [i].

Application of Algorithms 1 and 2 to apparatus in which the initial state is that port 5 (i=5) has a forward connection to ports 10, 11, 12, and 13, and port 10 is the responding destination will now be described with reference to Tables 1–3. In each case, the initial state is shown in Table 1. In the initial state, Memory 1 [5] is 129, meaning that port 5 is the source, and Memory 2 [5] is 10, meaning that port 10 is the responding destination. Memory 2 [11], Memory 2 [12], and Memory 2 [13] are each 255, indicating that each of these ports is tri-stated in the reverse direction so that response messages are blocked. In each state, every address other than those that are specifically listed contains the value 256 in both Memory 1 and Memory 2.

TABLE 1

| Address i | Memory 1 [i] | Memory 2 [i] |
| --- | --- | --- |
| 5 | 129 | 10 |
| 10 | 5 | 129 |
| 11 | 5 | 255 |
| 12 | 5 | 255 |
| 13 | 5 | 255 |

Table 2 represents a change from the initial state to a state in which port 6 is connected as source and port 11 is connected as responding destination and there are no other destinations. Memory 1 [i] and Memory 2 [i] for i=5, 10, 12, and 13 are each changed to 256. By identifying all the ports that are connected to the chain in the initial state and tri-stating each of these ports, the entire chain is tri-stated and the possibility of any of the ports of this chain impairing the new connection is removed. Memory 1 [6] is changed from 256 to 129 and Memory 2 [6] is changed from 256 to 11; and Memory 1 [11] is changed from 256 to 6 and Memory 2 [11] is changed from 256 to 129, indicating that port 6 is a source port and the response port is port 11.

TABLE 2

| Address i | Memory 1 [i] | Memory 2 [i] |
|---|---|---|
| 5 | 256 | 256 |
| 6 | 129 | 11 |
| 10 | 256 | 256 |
| 11 | 6 | 129 |
| 12 | 256 | 256 |
| 13 | 256 | 256 |

Table 3 represents a change from the initial state to the configuration in which port 6 is the source and port 5 is the responding destination and there are no other destinations. All the destinations in Table 1 have been tri-stated in both directions.

TABLE 3

| Address i | Memory 1 [i] | Memory 2 [i] |
|---|---|---|
| 5 | 6 | 129 |
| 6 | 129 | 5 |
| 10 | 256 | 256 |
| 11 | 256 | 256 |
| 12 | 256 | 256 |
| 13 | 256 | 256 |

The processor uses Algorithm 3 in order to establish a level II connection between one switcher port as a new source, a second switcher port as a responding destination, and at least one a non-responding destination.

Algorithm 3

```
Current Conn to New Dest ← Memory [New Dest]
Current Conn to New Source ← Memory 1 [New Source]
Added to Chain ← FALSE
if ( (Current Conn to New Source == 129) &&
     (Current Conn to New Dest ≠ New Source) )
{
    Memory 1 [New Dest] ← TRI STATE
    TakeFlag ← TRUE
    TakeDone ← FALSE
    while (TakeDone ==FALSE)
    ;
    Memory 1 [New Dest] ← New Source
    Memory 2 [New Dest] ← 255
    Added to chain ← TRUE
}
if ( (Current Conn to New Dest ≠ 256) &&
     (Current Conn to New Dest ≠ New Source) )
{
    if (Current Conn to New Dest == 129)
    }
        Current Conn to New Dest ← Memory 2 [New Dest]
    }
    Memory 1 [Current Conn to New Dest] ← 256
    Memory 2 [Current Conn to New Dest] ← 256
    Loop thru Memory 1 (Found Dest = 1 . . . 128)
    {
        if ( (Memory 1 [Found Dest] == New Dest) ||
             (Memory 1 [Found Dest] == Current conn to new
             dest)
        {
            Memory 1 [Found Dest] ← 256
            Memory 2 [Found Dest] ← 256
        }
    }
}
if ( (Current Conn to New Source ≠ 256) &&
     (Added to chain == FALSE)              &&
     (Current Conn to New Dest ≠ New Source)
{
    if (Current Conn to New Source == 129)
    {
        Current Conn to New Source ← Memory 2 [New Source]
    }
    Memory 1 [Current Conn to New Source] = 256
    Memory 2 [Current Conn to New Source] = 256
    Loop thru Memory 1 (Found Deat = 1 . . . 128)
    {
        If Memory 1 [Found Dest] == Current Conn to New
Source
        {
            Memory 1 [Found Dest] ← 256
            Memory 2 [Found Dest] ← 256
        }
    }
}
if  (Added to chain == FALSE)
{
    TakeFlag ← TRUE
    TakeDone ← FALSE
    While (TakeDone == FALSE)
    ;
    Memory 1 [New Source] ← 129
    Memory 1 [New Dest] ← New Source
    Memory 2 [New Dest] ← 129
    Memory 2 [New Source] ← New Dest
}
```

In an application of Algorithms 2 and 3 to connect the switcher port 20$k$ as a new source and ports 20$l$ and 20$m$ as new destinations, Memory 1 [k] and Memory 2 [k] are set to 129 and 1 respectively, Memory 1 [l] and Memory 2 [l] are set to k and 129 respectively, and Memory 1 [m] and Memory 2 [m] are set to k and 255 respectively.

Algorithm 3 assigns the value k to the variable New Source and assigns the value 1 to the variable New Dest and the processor reads Memory 1 [k] and Memory 1 [l]. The flag Added to Chain is set FALSE.

If Memory 1 [k] is 129 and Memory 1 [l] is not k, the port 20$k$ is already in use in a different chain and has a responding destination other than the port 20$l$. Memory 1 [k] is set to 256 (tri-state) and the flags TakeFlag and TakeDone are set TRUE and FALSE respectively. Operation is suspended while TakeDone is FALSE. Upon completion of Algorithm 2, TakeDone is set TRUE, and Memory 1 [l] is set to k and Memory 2 [l] is set to 255. The flag Added to Chain is set TRUE. In the case in which Algorithms 1 and 3 are executed using a main interface processor and Algorithm 2 is executed using a port control processor, TakeDone may be set TRUE by including in Algorithm 2 a command that causes the port control processor to generate an interrupt request, which is timed relative to the frame sync information of the master reference signal, when Algorithm 2 is complete. The main interface processor responds to the interrupt request by setting TakeDone to TRUE.

If Memory 1 [l] is not equal to 256 and Memory 1 [l] is not equal to k, the algorithm evaluates whether Memory 1 [l] is 129. If so, the new destination is currently in use as a source, and Memory 2 [l] indicates the responding destination, say q. Memory 1 [q] and Memory 2 [q] are each set to 256. The value Memory 1 [i] is read for i from 1 to 128, and if Memory 1 [i] is equal to l or q, Memory 1 [i] and Memory 2 [i] are each set to 256. In this manner, every destination tied to the port 201 has been tri-stated, and the port 201 has been tri-stated.

If Memory 1 [k] is not equal to 256, and Added to Chain is FALSE, and Memory 2 [l] is not equal to k, the algorithm determines whether Memory 1 [k] is equal to 129. If so, the port 20$k$ is currently in use as a source and Memory 2 [k] indicates the responding destination, say r. Memory 1 [r] and Memory 2 [r] are each set to 256. The value Memory 1 [i] is read for i from 1 to 128, and if Memory 1 [i] is equal to Memory 2 [k], both Memory 1 [i] and Memory 2 [i] are set to 256. In this manner, every port tied to the port 20k is tri-stated.

If the flag Added to Chain is FALSE, the flag TakeFlag is set TRUE and the flag TakeDone is set FALSE. Operation is suspended so long as TakeDone is FALSE. Upon completion of Algorithm 2, TakeDone is set TRUE, and Memory 1 [k] is set to 129, Memory 1 [l] is set to k, Memory 2 [k] is set to 1, and Memory 2 [l] is set to 129. In this manner, the contents of Memories 1 and 2 can reflect the fact that the new source 20k will be used as a source and there is to be a forward connection to the port 20l, and that the port 20l will be a responding destination and there will be a reverse connection to the port 20k.

The foregoing operations are then repeated for the port 20m as a destination in lieu of the port 20l. The proper values for Memory 1 [m] and Memory 2 [m], reflecting that the port 20m is a non-responding destination with respect to the port 20k as source, are set.

Tables 5–9 illustrate examples of successive switch takes from the initial system state defined in Table 4, in which there is a forward path from port 5 to each of ports 10, 11, 12, and 13, and a reverse path from port 10 to port 5, and there is a forward path from port 6 to each of ports 7, 14, 15, 33, and 34, and a reverse path from port 7 to port 6. The change shown by Table 5 is addition of port 2 to the forward path from port 5. Memory 1 [2] changes from 256 to 5 and Memory 2 [2] changes from 256 to 255.

Table 6 illustrates a take in which port 5 is added to the forward path from port 6. Memory 1 [5] changes from 129 to 6 and Memory 2 [5] changes from 10 to 255. The chain that was sourced by port 5 is broken, and the Memory 1 and Memory 2 for each of ports 10–13 are changed to 256 (tri-stated in both directions).

Table 7 illustrates a take in which port 11 is added to the forward path from port 6. Removal of port 11 from the forward path from port 5 results in port 5, and the ports connected to the forward path from port 5 (other than port 11) being tri-stated in both directions.

Table 8 illustrates a take in which a single point connection is made from port 10 as source to port 7 as destination. Removal of port 7 from the forward path from port 6 and removal of port 10 from the forward path from port 5 results in all other ports shown in Table 4 being tri-stated.

TABLE 4

| Address i | Memory 1 [i] | Memory 2 [i] |
| --- | --- | --- |
| 5 | 129 | 10 |
| 6 | 129 | 7 |
| 7 | 6 | 129 |
| 10 | 5 | 129 |
| 11 | 5 | 255 |
| 12 | 5 | 255 |
| 13 | 5 | 255 |
| 14 | 6 | 255 |
| 15 | 6 | 255 |
| 33 | 6 | 255 |
| 34 | 6 | 255 |

TABLE 5

| Address i | Memory 1 [i] | Memory 2 [i] |
| --- | --- | --- |
| 2 | 5 | 255 |
| 5 | 129 | 10 |
| 6 | 129 | 7 |
| 7 | 6 | 129 |
| 10 | 5 | 129 |
| 11 | 5 | 255 |
| 12 | 5 | 255 |
| 13 | 5 | 255 |
| 14 | 6 | 255 |
| 15 | 6 | 255 |
| 33 | 6 | 255 |
| 34 | 6 | 255 |

TABLE 6

| Address i | Memory 1 [i] | Memory 2 [i] |
| --- | --- | --- |
| 2 | 256 | 256 |
| 5 | 6 | 255 |
| 6 | 129 | 7 |
| 7 | 6 | 129 |
| 10 | 256 | 256 |
| 11 | 256 | 256 |
| 12 | 256 | 256 |
| 13 | 256 | 256 |
| 14 | 6 | 255 |
| 15 | 6 | 255 |
| 33 | 6 | 255 |
| 34 | 6 | 255 |

TABLE 7

| Address i | Memory 1 [i] | Memory 2 [i] |
| --- | --- | --- |
| 5 | 256 | 256 |
| 6 | 129 | 7 |
| 7 | 6 | 129 |
| 10 | 256 | 256 |
| 11 | 6 | 255 |
| 12 | 256 | 256 |
| 13 | 256 | 256 |
| 14 | 6 | 255 |
| 15 | 6 | 255 |
| 33 | 6 | 255 |
| 34 | 6 | 255 |

TABLE 8

| Address i | Memory 1 [i] | Memory 2 [i] |
| --- | --- | --- |
| 5 | 256 | 256 |
| 6 | 256 | 256 |
| 7 | 129 | 10 |
| 10 | 7 | 129 |
| 11 | 256 | 256 |
| 12 | 256 | 256 |
| 13 | 256 | 256 |
| 14 | 256 | 256 |
| 15 | 256 | 256 |
| 33 | 256 | 256 |
| 34 | 256 | 256 |

The apparatus shown in FIGS. 1 and 2 may be used to provide communication between a personal computer, such as an IBM-PC compatible computer or an Apple Macintosh computer, and one or more other machines. Personal computers are designed to communicate with other machines using serial data signals in accordance with the Electronics Industries Association Recommended Standard 232 or RS-232.

An RS-232 port may be configured as either DTE or DCE. When implemented in an environment that employs 25-pin connectors, an RS-232 DTE port transmits data on pin 2 and receives data on pin 3, whereas an RS-232 DCE port transmits data on pin 3 and receives data on pin 2. Several other pairs of pins are employed to exchange control signals. For example, a DTE port asserts a request to send (RTS) signal at pin 4 and receives a clear to send (CTS) signal at pin 5, whereas a DCE port receives the RTS signal at pin 4 and asserts the CTS signal at pin 5. If a DTE port is connected pin to pin to a DCE port, the correct connections are made. However, it is not sufficient to be able to connect a DTE port to a DCE port, since it is frequently necessary to connect two DTE ports or two DCE ports. Furthermore some machines are configured to assert and respond to all the control signals specified in RS-232 whereas other machines assert and respond to fewer than all the control signals.

Several connection schemes have been developed to facilitate connection of RS-232 ports. In accordance with one scheme for connecting a DTE port to a DCE port, known as the XON/XOFF mode, pins 4, 5, and 6 of the DTE port are interconnected and pins 8, 20, and 22 are likewise interconnected, whereas pins 4, 5, and 20 of the DCE port are interconnected and pins 6, 8, and 22 remain unconnected. The DTE port is connected to the DCE port using a three wire cable that connects pins 2, 3, and 7 pin to pin. The DTE port receives its own RTS signal at pin 5 and responds as if it were receiving the DCE port's CTS signal, and similarly the DCE port receives its own CTS signal at pin 4 and responds as if it were receiving the DTE port's RTS signal. The other control signals are handled in similar fashion, and each machine behaves as if a full RS-232 connection had been established. This connection mode reduces the number of connections to be made between ports, but it does not eliminate the problem of interconnecting ports, since pins 2 and 3 are still properly connected pin to pin only for DTE to DCE and not for DTE to DTE or DCE to DCE.

Figure 3:
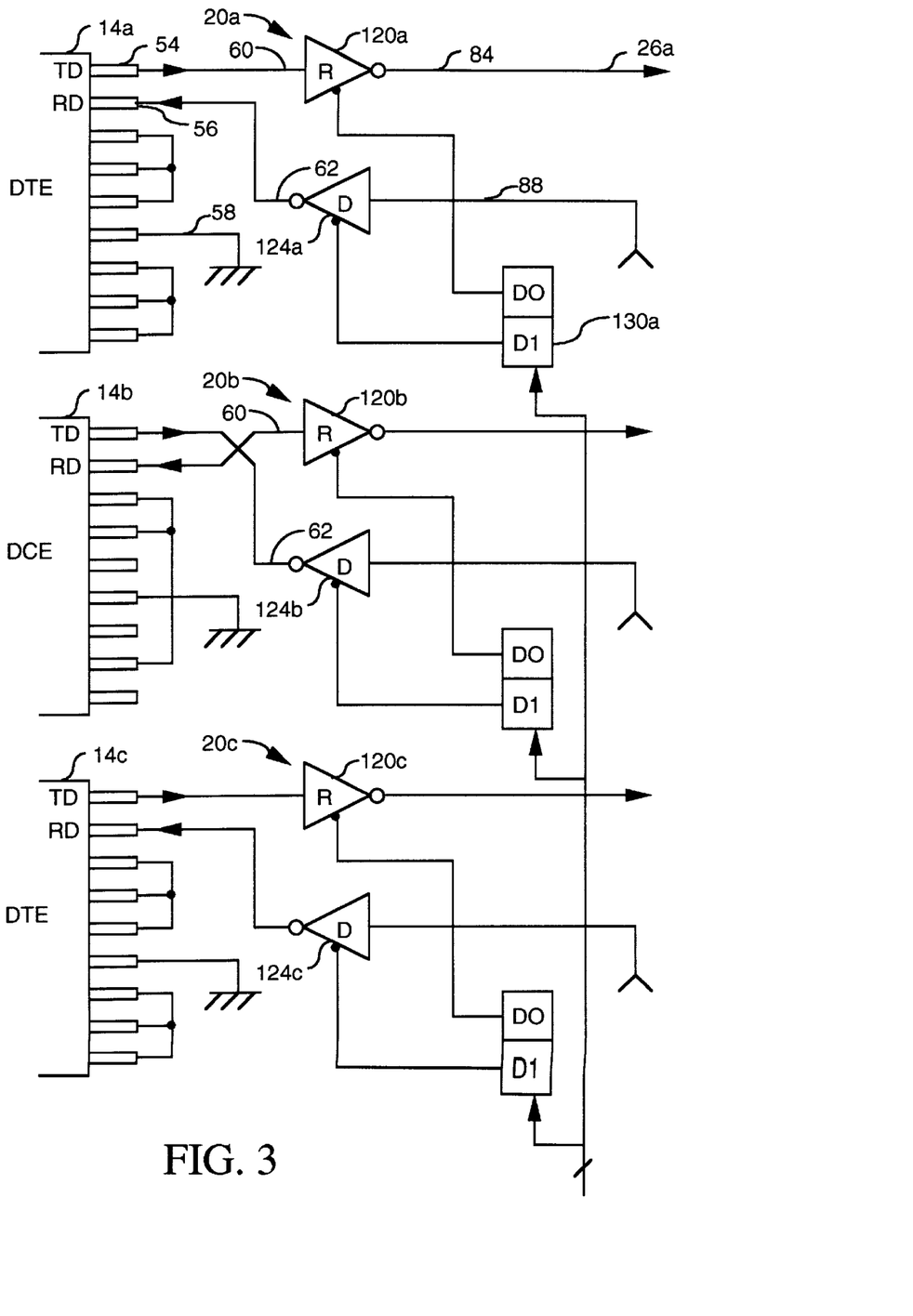
FIG. 3 is a partial block diagram of the FIG. 1 apparatus, illustrating in greater detail the switcher ports provided at the interface between the switcher and external machines included in the post production facility.

FIG. 3 is a partial view of a somewhat basic implementation of the switcher ports of the apparatus shown in FIGS. 1 and 2. The machine port 14a is an RS-232 DTE port that operates in the XON/XOFF mode, and the machine port 14b is an RS-232 DCE port that operates in the XON/XOFF mode.

As shown in FIG. 3, the port 14a has a TD data terminal 54, at which the port outputs data, and an RD data terminal 56, at which the port receives data. The port 14a also has a ground terminal 58. The terminals 54 and 56 are connected to terminals 60 and 62 respectively of the port 20a. The port 14b also has TD and RD data terminals and a ground terminal.

The ports 20a and 20b each comprise a tri-state receiver 120 and a tri-state driver 124. The input of the receiver 120 is connected to the terminal 60 and the output of the driver 124 is connected to the terminal 62. The output of the receiver 120 is connected to the port's output node 84, which is connected to the input line 26a of the matrix core, and the port's input node 88, which is connected to the output line 30a of the matrix core, is connected to the input of the driver 124. The port status memory 130 has a D0 terminal connected connected to the control terminal of the receiver 120 and similarly it has a D1 terminal connected to the control terminal of the driver 124. As indicated in FIG. 3, it is preferred that the port status memory be provided locally to the port and that its contents be updated by communicating from the switch controller 38 over a bus. The port 20b is similar to the port 20a but the connections to the TD and RD data terminals of the port 14b are reversed because the port 14b is a DCE port.

If the machine 10a, having the machine port 14a, is to communicate as master with the machine 10b (machine port 14b) as slave, the controller sets the word (D0,D1) for each of the switcher ports 20a and 20b at (1,1) indicating that the receivers 120a, 120b and the drivers 124a, 124b are enabled. The machine ports 14a and 14b are then able to communicate. If control of the slave machine 10b were transferred from the machine 10a to another master machine, the word (D0,D1) for the port 20a would be set at (0,0), thus tri-stating the receiver 120a and driver 124a. If the machine 10a were to communicate with both the responding slave machine 10b and a non-responding slave machine 10c, the word (D0,D1) for the port 20c would be (0,1), so that the driver 124c would communicate commands to the port 14c but the receiver 120c would block messages generated by the machine 10c. The messages would also be blocked by the crosspoint 34ca.

In a practical application of the apparatus shown in FIGS. 1 and 2 to a video post production facility, the master machine is a personal computer operating as an editor and the slave machines are VTRs. Whereas the personal computer's machine port is an RS-232 port, a VTR generally receives commands from, and provides responses to, a controlling machine using signals in accordance with Electronics Industries Association Recommended Standard 422, or RS-422. Consequently, in this particular application, it is only necessary for a switcher port that is connected to an RS-232 machine port to be either enabled or disabled, and it is not necessary that it be able to operate as a non-responding destination. In other applications, however, where the slave machines communicate using RS-232 signal, e.g. multiple laser disc players and computer memory storage arrays, it may be necessary or at least desirable for the switcher port to be able to operate as a non-responding destination.

As noted previously, FIG. 3 illustrates a somewhat basic implementation of a switcher port. The switcher port shown in FIG. 3 has three useful states, but the configuration of its connection to the machine port depends on whether the machine port is DCE or DTE. Therefore, if the machine port 14a, for example, were replaced with a DCE port, it would be necessary to reconfigure the switcher port 20a by exchanging the connections to the receiver 120a and driver 124a.

Figure 4:
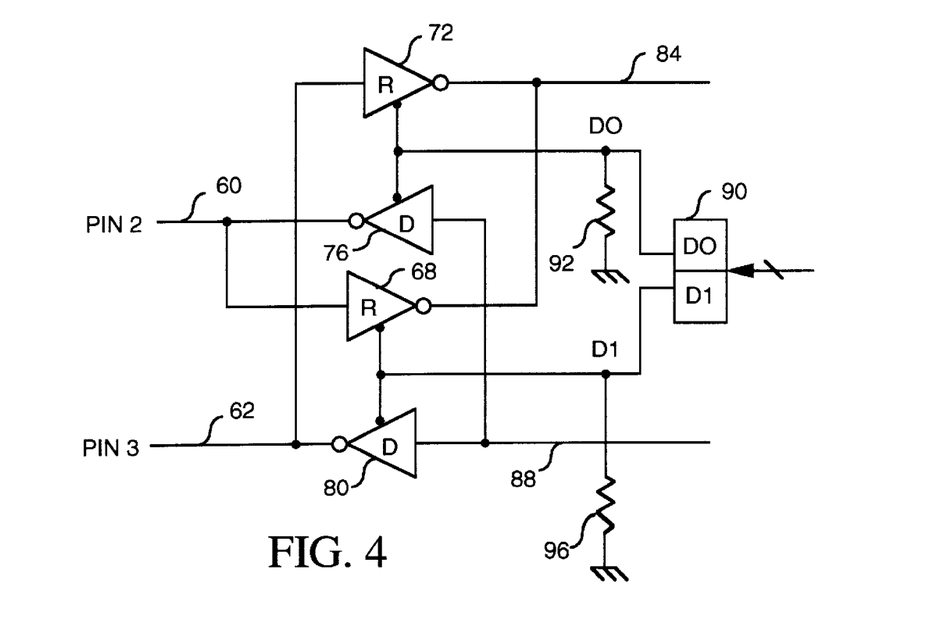
FIG. 4 is a block diagram of a modified form of switcher port.

FIG. 4 is a block diagram of a preferred form of switcher port for communicating with an RS-232 machine port operating in the XON/XOFF mode.

As shown in FIG. 4, the preferred switcher port comprises two tri-state receivers 68 and 72 and two tri-state drivers 76 and 80. The inputs of the receivers 68 and 72 are connected to terminals 60 and 62 respectively, and similarly the outputs of the drivers 76 and 80 are connected to terminals 60 and 62 respectively. The outputs of the two receivers 68 and 72 are connected to the port's output node 84, and the port's input node 88 is connected to the inputs of the drivers 76 and 80. The port status memory 90 has a D0 terminal connected to control terminals of the receiver 72 and driver 76, and similarly it has a D1 terminal connected to control terminals of the receiver 68 and driver 88. Due to the action of the pulldown resistor 92, the control terminals of the receiver 72 and driver 76 are high when the terminal D0 is at logic high and are low when the terminal D0 is high impedance or at logic low. The pulldown resistor 96 affects the control terminals of the receiver 68 and driver 80 in similar fashion.

It is preferred that the outputs of the receivers 68 and 72 and drivers 76 and 80 are inverted as shown in FIG. 4, but they could alternatively be non-inverted.

Upon installation of the apparatus shown in FIGS. 1 and 2 equipped with switcher ports as shown in FIG. 4, the operator uses the operator interface 50 to provide commands to the switch controller 38 to configure each switcher port depending on whether the machine port is a DTE port or a DCE port. In the case of a DCE port, a suitable command is delivered to the processor 42, or the separate port control processor if used, and the bit D1 is set low and the receiver 68 and driver 80 are thereby disabled. When the switcher port is not in use, the bit D0 is set low and otherwise it is set high. When the bit D0 is high the receiver 72 and driver 76 are enabled. The receiver 68 presents a high impedance to the output node 84. The receiver 72 connects terminal 62 of the switcher port to the output node 84 and the driver 76 connects the input node 88 to terminal 60. Conversely, in the case of a DTE port, the bit D0 is set low and the receiver 72 and driver 76 are disabled. When the port is in use, the bit D1 is set high and the receiver 68 and driver 80 are enabled. The receiver 68 connects terminal 60 to the output node 84 and the driver 80 connects the input node 88 to terminal 62. The receiver 72 presents a high impedance to the output node 84. Thus, regardless of whether the machine port is a DTE port or a DCE port, pin 2 of the machine port is connected to terminal 60 of the switcher port and pin 3 is connected to terminal 62, and the switcher port 14a can be configured to transmit data on the output node 84 and receive data on the input node 88. The switcher therefore allows RS-232 machine ports operating in the XON/XOFF mode to communicate with the switcher, and hence, each other, without regard to whether the machine port is DCE or DTE.

If the machine port 14a, for example, is unable to communicate in the XON/XOFF mode, it may be necessary to connect the machine port to two or more switcher ports to support exchange of RTS and CTS signals, for example. In this case the several switcher ports that are connected to a common machine port are logically linked for the purpose of the connection algorithms that are described above, and the linked switcher ports are treated as one.

The preferred application of the apparatus shown in FIGS. 1 and 2 is in a television post production facility, in which the switcher is used to provide flexible interconnection of machines such as editors and VTRs.

As noted in the co-pending application Ser. No. 08/048, 733, an RS-422 port can be configured to be either controlling or controlled, and its configuration can be changed. It will therefore be seen that in a professional video editing installation difficulty may arise due to the different communication protocols employed by different machines. In particular, in order to allow use of a personal computer as an editor, it has hitherto been necessary to include a protocol converter, for converting the edit commands generated by the personal computer from RS-232 form to RS-422 form and to convert the response messages delivered to the personal computer from RS-422 form to RS-232 form, even though the data rates and command formats of the signals may match.

In order to provide complete flexibility of connection among the machines in a post-production facility, it must be possible to connect any RS-232 port (DCE or DTE) to any other RS-232 port or to any RS-422 port (controlled or controlling), and it must also be possible to connect any RS-422 port (controlled or controlling) to the other type of RS-422 port (controlling or controlled) or to any RS-232 port.

A switcher port that is associated with a VTR may include an RS-422 port transceiver as shown in FIG. 4 of the co-pending application. This form of port transceiver, and the RS-232 form described herein, communicate with the matrix core using single-ended signals. Thus, conversion between RS-232 and RS-422 is accomplished at the switcher ports, without need for external converters, provided that the data rates and command formats are compatible between the connected machines.

In order to accommodate the different types of switcher port mentioned above, the controller includes a third memory, designated Memory 3, having one addressable location for each switcher port. Each memory location of Memory 3 stores a two bit word. The permitted values of the content of an addressable location of Memory 3 are 00, 01, or 02. The contents of Memory 3 designate the nature of the machine ports to which the switcher ports are connected. For a given location in Memory 3, the value 01 indicates RS-232 DTE port, the value 02 indicates RS-232 DCE port, and the value 00 indicates RS-422 port. Upon initial installation of the switcher in a post-production facility, the machine ports are connected to the various ports of the switcher and Memory 3 is initialized with the code describing each port. During each vertical interval of the master reference, the processor employs the contents of Memory 3 to refresh the port status memories of the switcher ports.

It will be appreciated that the invention is not restricted to the particular embodiments that have been described, and that variations may be made therein without departing from the scope of the invention as defined in the appended claims and equivalents thereof.

We claim:

1. A transceiver having first and second I/O ports (2,3) for connection to a signal transmitting and receiving machine, an input port (I) and an output port (O), and comprising a first receiver (R1) having an input connected to said first I/O port and an output connected to said output port of the transceiver, a second receiver (R2) having an input connected to the second I/O port and an output connected to the output port of the transceiver, a first driver (D1) having an input connected to the input port of the transceiver and an output connected to the first I/O port, and a second driver (D2) having an input connected to the input port of the transceiver and an output connected to the second I/O port the transceiver having a first state in which the first receiver and second driver are enabled and propagate signals from the first I/O port of the transceiver to the output port thereof and from the input port of the transceiver to the second I/O port and the second receiver is disabled and presents a high impedance to the output port of the transceiver, and a second state in which the second receiver and first driver are enabled and propagate signals from the second I/O port of the transceiver to the output port thereof and from the input port of the transceiver to the first I/O port and the first receiver is disabled and presents a high impedance to the output port of the transceiver.

2. Signal transmitting and receiving apparatus comprising:

a signal transmitting and receiving machine having an I/O port including first and second connection pins of which one is a transmitting pin and the other is a receiving pin, and the machine also comprising a driver for providing an output signal at the transmitting pin of its I/O port and a receiver for receiving an input signal at the receiving pin thereof, and a port transceiver having first and second I/O pins, an input pin and an output pin, the port transceiver having its first I/O pin connected to the first connection pin of the I/O port of the signal transmitting and receiving machine and its second I/O pin connected to the second connection pin of the I/O port of the signal transmitting and receiving machine, and the port transceiver comprising means providing a first output signal path from the first I/O pin of the port transceiver to the output pin thereof, means providing a second output signal path from the second I/O pin of the port transceiver to the output pin thereof, means providing a first input signal path from the input pin of the port transceiver to the first I/O pin thereof, and means providing a second input signal path from the input pin of the port transceiver to the second I/O pin thereof, and the port transceiver having a first state in which it propagates a signal received at its input pin to its second I/O pin and a signal received at its first I/O pin to its output pin and the second output signal path presents a high impedance to the output pin of the port transceiver, and the port transceiver also having a second state in which it propagates a signal received at its input pin to its first I/O pin and a signal received at its second I/O pin to its output pin and the first signal path presents a high impedance to the output pin of the port transceiver.

3. Apparatus according to claim 2, wherein the I/O port of the signal transmitting and receiving machine has first and second connection pin pairs, of which one pin pair is a transmitting pin pair and the other pin pair is a receiving pin pair, and the signal transmitting and receiving machine comprises a balanced driver for providing a differential output signal at the transmitting pin pair of its I/O port and a differential receiver for receiving a differential input signal at the receiving pin pair thereof, the first and second I/O ports of the port transceiver are differential ports and are connected to the first connection pin pair of the I/O port of the signal transmitting and receiving machine and the second connection pin pair of the I/O port of the signal transmitting and receiving machine respectively, the output signal paths of the port transceiver each include means for converting a differential signal to single ended form, and the input signal paths of the port transceiver each include means for converting a single ended signal to differential form.

4. Apparatus comprising:

n signal transmitting and receiving machines, where n is an integer greater than 1, each having an I/O port including a transmitting pin and a receiving pin, and each machine comprising a driver for providing an output signal at the transmitting pin of its I/O port and a receiver for receiving an input signal at the receiving pin thereof, n port transceivers each having a machine side input terminal, a machine side output terminal, a switcher side input terminal and a switcher side output terminal, the ith port transceiver, where 1<=i<=n, having its machine side input terminal connected to the transmitting pin of the ith machine and its machine side output terminal connected to the receiving pin of the ith machine, and each port transceiver comprising receiver means providing an output signal path from the machine side input terminal of the respective transceiver to the switcher side output terminal thereof, driver means providing an input signal path from the switcher side input terminal of the respective transceiver to the machine side output terminal thereof, and the receiver means having a first state in which it propagates a signal received at the machine side input terminal of the respective transceiver to the switcher side output terminal thereof and a second state in which the receiver means blocks a signal received at the switcher side input terminal and presents a high impedance to the machine side output terminal, and the driver means having a first state in which it propagates a signal received at switcher side input terminal of the respective transceiver to its machine side output terminal thereof and a second state in which the driver means blocks a signal received at the switcher side input terminal, control means for selectively placing each of the receiver means and the driver means in its first state or its second state, and a switcher having n input terminals and n output terminals, the ith input terminal of the switcher being connected to the switcher side output terminal of the ith port transceiver and the ith output terminal of the switcher being connected to the switcher side input terminal of the ith port transceiver, and the switcher comprising means for connecting the ith input terminal of the switcher to any set of output terminals of the switcher selected from the group that comprises at least the output terminals other than the ith output terminal.

* * * * *